United States Patent [19]

Shell

[11] 4,142,809
[45] Mar. 6, 1979

[54] CONNECTOR ASSEMBLY

[76] Inventor: Irving W. Shell, 442 Wellington Ave., Chicago, Ill. 60657

[21] Appl. No.: 906,777

[22] Filed: May 17, 1978

[51] Int. Cl.² .............................................. F16B 9/02
[52] U.S. Cl. .................... 403/201; 403/255; 403/348; 403/353; 248/251; 403/406
[58] Field of Search ............. 403/201, 242, 252, 255, 403/239, 348, 406, 353, 169–178, 189; 211/105.1, 207; 248/251, 239, 222.4, 223.1, 223.2, 73

[56] References Cited

U.S. PATENT DOCUMENTS

| 2,092,060 | 9/1937 | Gairing | 403/348 X |
| 2,471,839 | 5/1949 | Schumacher | 248/239 UX |
| 3,661,411 | 5/1972 | Flick | 403/348 |
| 3,867,048 | 2/1975 | Endzweig | 403/255 X |
| 3,969,031 | 6/1976 | Kroopp | 403/239 |

FOREIGN PATENT DOCUMENTS

| 281187 | 12/1914 | Fed. Rep. of Germany | 403/348 |
| 1564531 | 3/1969 | France | 403/255 |
| 319470 | 9/1929 | United Kingdom | 403/348 |
| 338856 | 11/1930 | United Kingdom | 403/348 |

Primary Examiner—Wayne L. Shedd
Attorney, Agent, or Firm—Vogel, Dithmar, Stotland, Stratman & Levy

[57] ABSTRACT

A connector assembly includes a hollow rectangular tubular member having keyhole apertures therein with large rounded upper head portions and narrow rectangular neck portions. A cylindrical connector has an axially extending projection at one end with a square neck and circular head which are respectively matable with the neck and head portions of the keyhole aperture for non-rotatable mounting therein. The connector has a radial internally threaded bore for receiving a rod to support associated structures. The connector may be mounted in any of four positions so that the rod extends up, down or laterally. The connector has circumferential and longitudinal grooves to facilitate holding in telescoping relation thereover an associated hollow cylindrical sleeve, which may additionally be locked in place by a setscrew received through the sleeve and into the bore.

10 Claims, 9 Drawing Figures

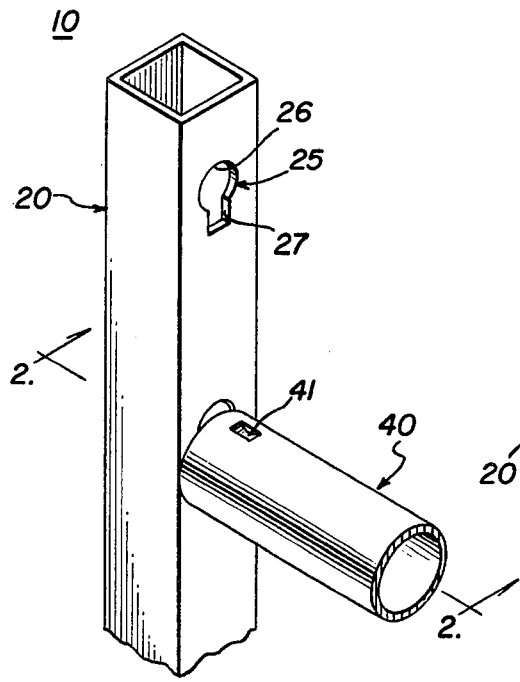
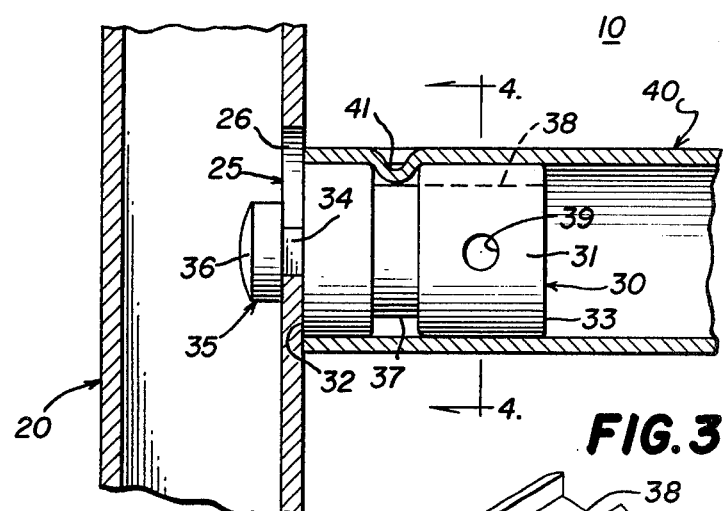
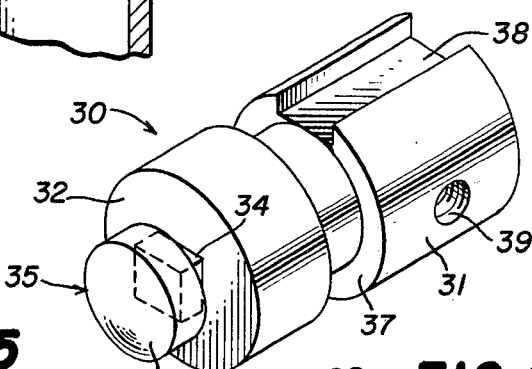
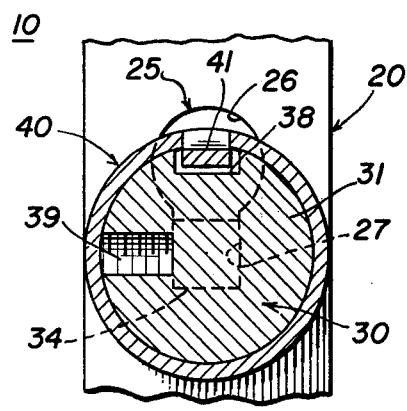
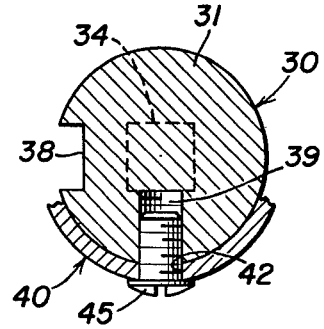
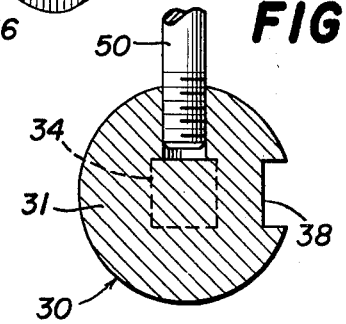
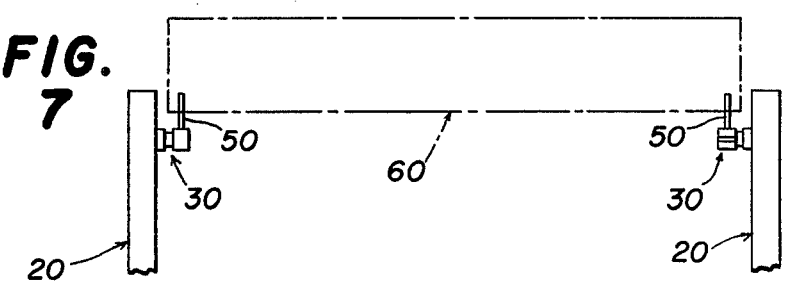
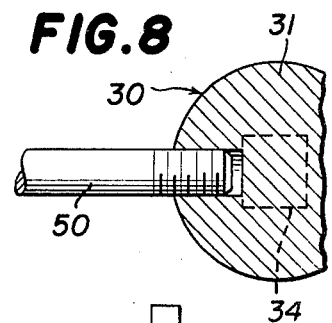
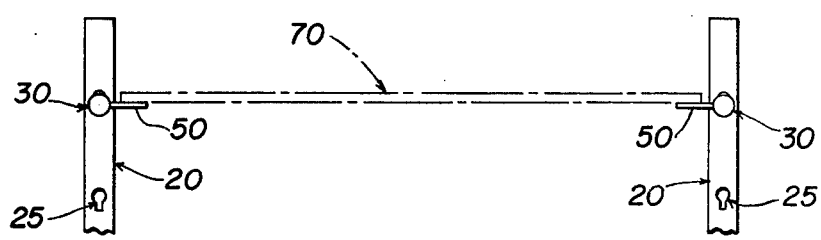

CONNECTOR ASSEMBLY

BACKGROUND OF THE INVENTION

The present invention relates to connectors for structural assemblies such as storage racks, scaffolding, and the like. While such connector assemblies are known in the art, they have heretofore been characterized by a number of limitations.

For example, typical structural arrangements are illustrated in U.S. Pat. Nos. 3,532,369, issued to F. W. Reilly on Oct. 6, 1970 and 3,901,613, issued to S. O. Andersson on Aug. 26, 1975. But both of these prior arrangements are adapted for coupling hollow tubular members, and are not readily adaptable for coupling other types of members such as solid rods.

Furthermore, these prior devices do not provide simple, yet securely latched and tight interconnections. Reilly simply provides a friction fit between the members, while Andersson requires separate screw-threaded fasteners to couple the connector member to each of the members which it connects together, the entire coupling comprising at least six pieces.

A keyhole slot and mating pin arrangement is shown in U.S. Pat. No. 3,849,012, issued to T. L. Krouse on Nov. 19, 1974. In Krouse the connector pins are fixedly secured to one of the two members to be joined together and the members can, therefore, be mounted together in only one orientation.

SUMMARY OF THE INVENTION

The present invention provides an improved connector assembly which avoids the drawbacks of prior art systems while affording important additional advantages.

One important feature of the present invention is that it provides a connector member which is adapted for connecting together two other members which may be of differing types as, for example, hollow tubular members and solid rod members.

In connection with the foregoing feature, another feature of the invention is that the connector member is separable from the two members which it connects together and is mountable in a plurality of different positions for providing different orientations of the interconnected members with respect to each other.

Another feature of this invention is to provision of a versatile connector assembly which interconnects different types of members and yet provides tight locking connections therebetween.

In summary, these and other features are achieved by providing a connector for coupling first and second members wherein the first member has a keyhole aperture therein with an enlarged round upper head portion and a small rectangular neck portion, the connector comprising a cylindrical body having a projection extending axially from one end thereof, the projection having a neck of square transverse cross section dimensioned non-rotatably to fit into neck portion of the first member and an enlarged rounded head dimensioned to fit into the head portion of the keyhole aperture of the first member but to prevent passage through the neck portion thereof, the body having a bore extending radially thereinto for receiving therein the second member, whereby the connector is non-rotatably mountable in the keyhole aperture of the first member in any of four different orientations respectively carrying the second member for extension upwardly or downwardly or laterally to either side.

Further features of the invention pertain to the particular arrangement of the parts of the connector assembly whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a fragmentary perspective view of one configuration of connector assembly constructed in accordance with and embodying the features of the present invention;

FIG. 2 is an enlarged view in vertical section taken along the line 2—2 in FIG. 1;

FIG. 3 is a further enlarged perspective view of the connector member of the present invention;

FIG. 4 is a view in vertical section taken along the line 4—4 in FIG. 4;

FIG. 5 is a fragmentary view, similar to FIG. 4, and showing another configuration of the connector assembly;

FIG. 6 is a view similar to FIG. 5, and showing yet another configuration of the connector assembly of the present invention;

FIG. 7 is a fragmentary diagrammatic front elevational view of an application of the connector assembly configuration of FIG. 6;

FIG. 8 is a fragmentary view, similar to FIG. 6, showing still another configuration of the connector assembly of the present invention; and FIG. 9 is a fragmentary view, similar to FIG. 7, showing an application for the connector assembly configuration of FIG. 8.

DESCRIPTION OF THE PREFERRED EMBODIMENT

Referring now to FIGS. 1 through 4 of the drawings, there is illustrated a connector assembly, generally designated by the numeral 10, which includes a support post 20, coupled to a tube 40 by a connector member 30. The post 20 is preferably a hollow tubular member substantially rectangular in transverse cross section and is preferably formed of metal. Normally, the post 20 is disposed in an upstanding configuration and is provided in one face thereof with a plurality of longitudinally spaced-apart keyhole apertures, each generally designated by the numeral 25, each of the apertures 25 having a part-circular enlarged upper head portion 26 communicating with a narrow rectangular neck portion 27.

The connector member 30 is preferably of unitary single-piece construction, is preferably made of hardened zinc, and may be formed by machining or by casting. The connector member 30 has a solid cylindrical body 31 terminated by flat circular parallel end surfaces 32 and 33. Extending from the end surface 32 axially of the body 31 is a projection, generally designated by the numeral 35, which includes a short neck 34 of square cross section and an enlarged generally cylindrical head 36 substantially circular in transverse cross section. The head 36 is dimensioned to be received through the head portion 26 of the keyhole aperture 25, but to prevent passage through the neck portion 27 of the keyhole aperture 25. The neck 34 has a width only slightly less than the width of the neck portion 27 of the keyhole aperture 25 so as to be freely but non-rotatably receivable therein. The outer surface of the cylindrical body 31 is provided with a circumferential groove 37 therearound which is preferably substantially rectangular in longitudinal cross section, and a groove 38 which extends longitudinally of the body 31 from the end surface 32 to the groove 37, the groove 38 being substantially rectangular in transverse cross section. The cylindrical body 31 is also provided with a radially extending and internally threaded bore 39 therein intermediate the groove 37 and the end surface 33 and angularly displaced about 90 degrees from the groove 38.

In use, the connector member 30 is mounted on the post 20 by insertion of the projection 35 into a selected one of the keyhole apertures 25, and sliding the neck 34 firmly down into the neck portion 27 of the keyhole aperture 25. When thus mounted, the connector member 30 cannot be pulled laterally from the keyhole aperture 25, nor can it rotate on its axis with respect to the post 20. If desired, the side edges of the neck portion 27 of the keyhole aperture 25 may converge slightly toward the bottom thereof to provide a snug wedge fit of the neck 34 therein. It will also be appreciated that the connector member 30 may be mounted in any one of four different positions on the post 20, depending upon which one of the four faces of the neck 34 is disposed at the bottom of the neck portion 27 of the keyhole aperture 25. Thus, these four positions are spaced apart 90 degrees from one another.

The tube 40 is preferably a hollow cylindrical member circular in transverse cross section and is provided adjacent to one or both ends thereof with an inwardly extending projection 41 which is preferably punched or stamped from the wall of the tube 40. The inner diameter of the tube 40 is approximately equal to the outer diameter of the cylindrical body 31 of the connector member 30 so that the tube 40 just fits telescopically over the connector member 30, as is best illustrated in FIG. 2. Because of this snug fit, the tube 40 may be fitted over the connector member 30 only when the projection 41 is aligned with the groove 38 for reception therein and keyed movement longitudinally therealong. The projection 41 is so positioned that it will be disposed in the circumferential groove 37 when the adjacent end of the tube 40 abuts against the surface of the post 20. At this point, the tube 40 may be rotated to move the projection 41 past the groove 38, thereby preventing accidental removal of the tube 40 from the connector member 30.

The tube 40 is also preferably provided with a radially extending aperture 42 therein (see FIG. 5), which is so positioned as to be disposable in alignment with the bore 39 when the projection 41 is disposed in the circumferential groove 37 and out of alignment with the groove 38. Thus, a setscrew 45 is receivable through the aperture 42 and threadedly engageable in the bore 39 securely to lock the tube 40 in position on the connector member 30. Preferably, in this arrangement, the connector member 30 will be mounted in the configuration illustrated in FIG. 5, so that the setscrew 45 is disposed on the underside of the tube 40 so as to be substantially out of sight.

It will be appreciated that the tube 40 may be an elongated member which extends between two adjacent posts 20, or it may be a short stub member which cooperates with other such members to provide end or stub supports for shelves or the like.

Referring now to FIGS. 6 through 9 of the drawings, there is illustrated another configuration of the connector assembly 10 of the present invention. In this configuration, the connector member 30 is mounted on the post 20 in the same manner as was described above, but it is utilized for connecting to the post 20 a solid metal rod 50, rather than a hollow tubular member. The rod 50 is externally threaded at one end for threaded engagement in the bore 39 so that it extends radially outwardly from the connector member 30. In FIG. 7 there is illustrated a typical application for this connector configuration. In this application, there are provided a pair of spaced-apart posts 20, each provided with a connector member 30 mounted thereon in substantially coaxial arrangement. In this configuration the connector members 30 are so oriented on the posts 20 that the rods 50 extend vertically upwardly, and may be provided with suitable attachment means to support therebetween any desired object 60, which may be a sign or the like.

In FIGS. 8 and 9 there is illustrated another configuration wherein the connector member 30 is so oriented that the rod 50 extends horizontally laterally therefrom. In FIG. 9 one application for this configuration is shown, including a pair of laterally spaced-apart posts 20, each having a connector member 30 mounted thereon in horizontal alignment, and oriented so that the rods 50 thereof extend laterally inwardly toward each other. Preferably, the rods 50 are short stub members which cooperate to support thereon the opposite ends of a beam member 70 which may be a shelf or the like.

It is also contemplated that the cylindrical body 31 of the connector member 30 may have an axially extending bore in the end surface 33 thereof which may also be internally threaded for receiving rod-like members coaxially of the connector member 30. Also, while the tube 40 has been illustrated as having a circular cross section, it will be understood that a rectangular cross section tube could be used.

From the foregoing, it can be seen that there has been provided an improved connector assembly which affords simple and economical construction while achieving great versatility and at the same time providing important advantages over prior art devices.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A connector for coupling first and second members wherein the first member has a keyhole aperture therein with an enlarged round upper head portion and a small rectangular neck portion, said connector comprising a cylindrical body having a projection extending axially from one end thereof, said projection having a neck of square transverse cross section dimensioned non-rotatably to fit into the neck portion of the first member and an enlarged rounded head dimensioned to fit into the head portion of the keyhole aperture of the first member but to prevent passage through the neck portion thereof, said body having a bore extending radially thereinto for receiving therein the second member, whereby said connector is non-rotatably mountable in the keyhole aperture of the first member in any of four different orientations respectively carrying the second member for extension upwardly or downwardly or laterally to either side.

2. The connector of claim 1, wherein said connector is of unitary one-piece construction.

3. The connector of claim 1, wherein said bore is internally threaded.

4. The connector of claim 1, wherein said connector is formed of hardened zinc.

5. The connector of claim 1, wherein said cylindrical body has a circumferential groove therein intermediate the ends thereof and a longitudinal groove extending from said circumferential groove to the end of said body opposite said one end, whereby said connector is adapted for receiving thereon an associated hollow cylindrical sleeve with an inwardly extending projection receivable in said grooves for locking the sleeve in place on said cylindrical body.

6. A coupling comprising a first member having a keyhole aperture therein with an enlarged round upper head portion and a small rectangular neck portion; a connector having a cylindrical body and a projection extending axially from one end of said body, said projection having a neck square in transverse cross section and dimensioned non-rotatably to fit into said neck portion of said keyhole aperture and an enlarged rounded head dimensioned to fit into said head portion of said keyhole aperture but to prevent passage through said neck portion thereof, said body having a bore extending radially thereinto; and a second member receivable in said bore; whereby said connector is non-rotatably mountable in said keyhole aperture of said first member in any of four different orientations respectively carrying said second member for extension upwardly or downwardly or laterally to either side.

7. The coupling of claim 6, wherein said second member comprises a cylindrical rod.

8. The coupling of claim 6, wherein said second member comprises a cylindrical rod threadedly engageable in said bore.

9. The coupling of claim 6, and further including a hollow cylindrical tube having a radial aperture therein and adapated to be telescopically received over said connector with said aperture aligned with said bore, said second member comprising a setscrew receivable through said aperture and threadedly engaged in said bore for fixedly positioning said sleeve on said connector.

10. The coupling of claim 6, wherein said first member is a hollow tubular member substantially rectangular in transverse cross section.

* * * * *